United States Patent [19]
Duquesnes

[11] Patent Number: 6,016,898
[45] Date of Patent: Jan. 25, 2000

[54] HYDRAULIC CONNECTOR FOR HYDRAULIC CLUTCH CONTROL

[75] Inventor: Laurent Duquesnes, Pouilloy, France

[73] Assignee: Valeo, Paris, France

[21] Appl. No.: 09/068,947

[22] PCT Filed: Sep. 25, 1997

[86] PCT No.: PCT/FR97/01681

§ 371 Date: May 21, 1998

§ 102(e) Date: May 21, 1998

[87] PCT Pub. No.: WO98/13613

PCT Pub. Date: Apr. 2, 1998

[30] Foreign Application Priority Data

Sep. 26, 1996 [FR] France .................................. 96 11841

[51] Int. Cl.[7] .................................................. F16D 19/00
[52] U.S. Cl. ..................... 192/85 R; 192/85 CA
[58] Field of Search .................. 192/85 R, 91 A, 192/110 B, 85 CA, 98

[56] References Cited

FOREIGN PATENT DOCUMENTS

| 2194263 | 2/1974 | France . |
| 2698931 | 6/1994 | France . |
| 2736136 | 1/1997 | France . |
| 2815971 | 10/1979 | Germany . |
| 4412734 | 3/1995 | Germany . |

*Primary Examiner*—Charles A. Marmor
*Assistant Examiner*—Tisha D. Waddell
*Attorney, Agent, or Firm*—Liniak, Berenato, Lonagacre & White

[57] ABSTRACT

The connector (4) includes a plate (41) covering an aperture (40) in a hood (2), and a feed duct (5) for the hydraulic clutch control unit (9), and the plate (41) carries a deformable clip (30) having a hooking portion (34, 35) for cooperation with the edge of the aperture (40) in the hood (2).

22 Claims, 5 Drawing Sheets

HYDRAULIC CONNECTOR FOR HYDRAULIC CLUTCH CONTROL

The present invention relates to hydraulic connectors, for a hydraulic clutch control unit, which is provided with a feed inlet for its control chamber and is mounted within a hood, such as the casing hood of the gearbox of a motor vehicle, comprising, firstly, a plate for fastening the said connector on the hood and for covering at least a major part of an aperture formed in the hood for giving access to the feed inlet, and secondly, a feed duct (5) carried by the said plate for connecting the feed inlet of the said control unit to an emitter governing the latter.

Such a connector is described in the document FR-A-2 698 931.

The control unit is for simplicity referred to as a hydraulic clutch control unit, given that its control chamber may be fed with a fluid which is liquid such as oil, or gaseous such as compressed air.

In the known way, a clutch is disposed downstream of a driving shaft for controlling the driving of a driven shaft.

The clutch usually includes, firstly, on the driving shaft side, a primary bloc comprising a flywheel, which may be of divided form and which drives in rotation a hub which is fixed disengageably to the flywheel, and a declutching device which is arranged to control disengagement of the hub from the flywheel when it is subjected to appropriate action in the axial direction, and secondly, on the driven shaft side, a secondary bloc comprising a clutch release bearing which is maneuvered by a control unit so as to act axially on the declutching device of the clutch, which consists usually of a diaphragm, or, in another version, of declutching levers which act on helical springs.

For more details, reference should for example be made to Application FR-A-2 698 931 mentioned above, given that usually, the primary bloc includes a clutch mechanism which is attached on the driving flywheel after the fitting in place of a clutch friction wheel, which includes friction liners coupled rigidly or elastically to the hub and adapted to coupled in rotation to the input shaft of the gearbox in the context of application to a motor vehicle, the flywheel then being arranged to be fixed in that case on the crankshaft of the internal combustion engine of the vehicle.

The clutch mechanism includes a cover plate which is arranged to be fixed on the driving flywheel, which constitutes a reaction plate. The diaphragm or the helical springs bear on the cover plate so as to act on a pressure plate which is coupled in rotation to the cover plate but with axial mobility, typically by means of resilient tongues.

Thus the diaphragm (i.e. the Belleville ring portion of the latter), or the helical springs, bias the pressure plate towards the reaction plate in order to grip the friction liners between the said plates.

The clutch is thus normally engaged. In order to disengage the latter it is necessary to act axially on the declutching device in a pulling mode or a pushing mode, using a clutch release bearing, so as to cause the action of the diaphragm or helical springs to cease and so release the friction liners.

The said clutch release bearing is here maneuvered by the hydraulic clutch control unit, which comprises two parts in piston-and-cylinder relationship, namely a fixed part defining a cavity and a movable part consisting of a piston, which is movable within the said cavity so as to define with the latter a variable volume control chamber.

The fixed part includes a feed inlet for feeding the cavity and therefore the control chamber. This control unit is mounted within a hood. The function of the hydraulic connector is to enable the hood to be passed through in order to connect from outside the hydraulic clutch control unit, constituting a receiver, to a feed duct coming from an emitter.

In order to achieve these things it is usual to provide, firstly, individual mounting of the primary bloc from the driving flywheel, and secondly, individual mounting of the secondary bloc from, for example, the casing of the gearbox, and then to assemble these blocs together by bringing them together axially. It is therefore important that these mounting operations should be as rapid and simple as possible, in order to reduce, in particular, assembly time on the assembly line.

In the document FR-A-2 698 931, the plate is fixed to a cover which is itself fixed to the hood with the aid of fastening members.

Fitting is not as easy, inexpensive and rapid as is desirable, and makes it necessary to form threaded holes in the hood.

An object of the present invention is to overcome these drawbacks in a simple, easy, inexpensive and rapid way.

It is therefore an object of the invention to provide a hydraulic connector the fitting of which on the hood is simple, easy, inexpensive and rapid.

It is a further object of the invention to simplify the hood and to reduce costs.

In accordance with the invention, a connector of the type defined above is characterised in that the plate carries a deformable clip having a hooking portion for cooperation with the edge of the aperture in the hood.

This clip may be elastically deformable or plastically deformable, and it assists ventilation within the hood.

Thanks to the invention, there is no need to provide a cover, so that costs, and the number of components, are reduced. Assembly does not call for use of any tool, nor does it require fastening screws, and it is therefore inexpensive.

The plate with its less costly clip constitutes a subassembly which can be handled and transported, and which cannot be lost.

The deformability of the clip facilitates fitting of the hooking portion on the hood. This clip can easily be removed.

Thus, thanks to the invention, fitting of the plate is carried out directly on the hood by means of the clip, and this takes place rapidly, easily, without any tool and without having to carry out any screwing operation that necessitates forming screw threads in the hood, so that the latter is simplified.

Preferably, the plate is fixed to the feed duct, being preferably integral with the feed duct that extends through the plate. This arrangement enables the connector to be further simplified, and is favourable to rapid fitting of the latter on the feed inlet for the hydraulic control unit and on the pipe coming from the emitter.

The said inlet may have a penetrating head, and the feed duct may have an expanded associated end.

Thus, it is possible to fit the feed duct, in the form of a pipe, on the feed inlet and then to secure them together rapidly by clipping with the aid of an elastic pinch clip.

More precisely, the feed inlet may include a groove for receiving the pinch clip, which is generally U-shaped and which is engaged in apertures formed in the end of the feed duct.

As will be understood, fitting of the secondary bloc with its connector on, for example, the casing of the gearbox is rapid, inexpensive, simple and easy.

According to one feature, the clip is carried by the plate by virtue of a hole in the latter, the said clip generally covering the said hole. This hole is generally rectangular in form. In another version, it is blind, with one of the lateral sides of the rectangle being open.

In all cases, the clip has a clipping portion for attaching the said clip to the lateral edge of the hole. This clipping portion is for example in the general form of an omega. The clip includes a loop joining this clipping portion to the hooking portion of the clip by which the latter is attached on the edge of the aperture in the hood.

The hooking portion preferably comprises a fastening hook which enables the clip to be snap-fitted on the hood.

Preferably, the plate includes a shoulder for cooperation with a portion of the edge of the aperture in the hood and for retaining the said plate in position. This plate also includes an edge portion for cooperation in intimate contact with a casing wall from which the hood projects, so as to centre the plate.

This edge portion, which is directed inwardly, enables the plate to be immobilised against rotation by cooperation of the edge portion with the aperture in the hood. It also constitutes an axial abutment.

Preferably, the plate, with its feed duct, is of a mouldable material, and the said duct extends on the outside (on the other side of the plate) so as to have a purge cock formed by moulding and enabling the control unit to be purged from outside the hood, in a way which is easy by contrast with a typical arrangement of the type described in the document DE-A-2 815 971. This also enables the number of ducts to be reduced.

The loop of the clip is favourable to ventilation and can be mounted inside or outside the hood, according to the application and the space available. This loop renders the clip deformable, and facilitates its hooking engagement on the hood by pushing on the said loop.

According to the form of the hood, it is possible to construct in advance a sub-assembly consisting of the hydraulic clutch control unit and the connector, to introduce this into the interior of the hood, and subsequently to carry out the fastening operations.

The following description illustrates the invention with reference to the attached drawings, in which:

FIG. 1 generally consists of a half view in axial cross section of the secondary bloc of the clutch with the connector in accordance with the invention, the flywheel which drives the primary bloc being shown but not the other components fixed to the latter;

Figure 1:
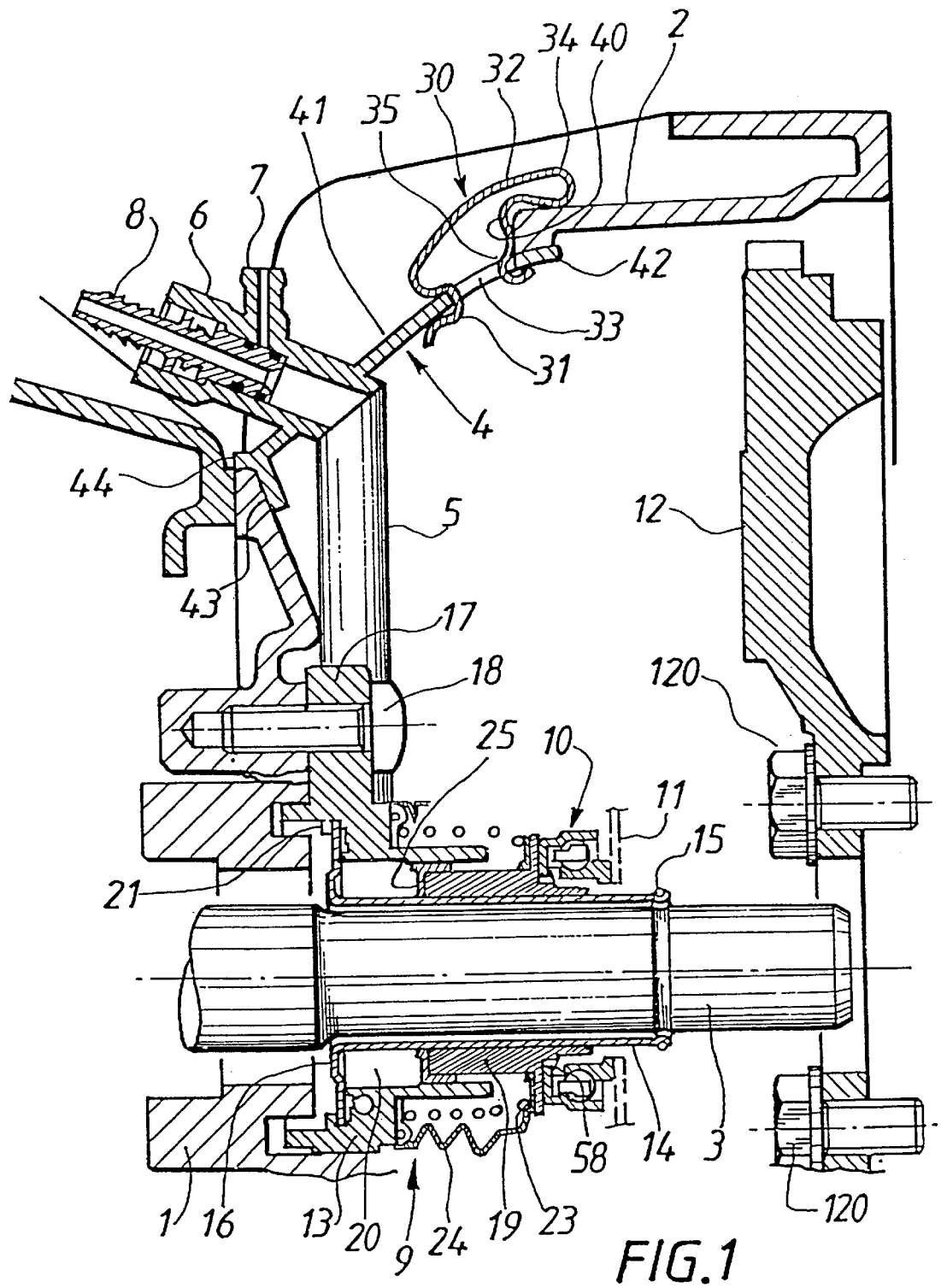

The drawings illustrate the invention in the context of an application to a motor vehicle clutch.

Thus there are seen, at 1 the casing of the gearbox, at 2 the hood which is fixed to the casing 1, at 3 the input shaft of the gearbox, at 9 the hydraulic clutch control unit which is mounted inside the hood 2, the form of which is generally that of a cloche, and at 4 the hydraulic connector in accordance with the invention which is mounted on the said hood 2 by means of an aperture 40 formed for this purpose in the hood.

The control unit carries a feed inlet 22 projecting radially. The connector 4 is arranged to be connected on this inlet 22 in a manner to be described below, and has on the outside of the hood 2 a pipe terminal 6 for coupling the connector with a duct coming from an emitter; the hydraulic control unit constitutes a receiver, in this example of the concentric type, through which the input shaft 3 of the gearbox passes in a manner to be described below.

The control unit 9 acts on the clutch release bearing 10, which in this example is in the form of a ball bearing with a rotatable inner ring and a fixed outer ring.

In the known way, the release bearing 10 acts on the declutching device of the clutch, in this example on the inner ends of the fingers of a diaphragm 11, so as to manoeuvre the clutch, of which only the driving flywheel 12, adapted to be secured by means of screws 120 on the crankshaft of the engine of the vehicle, is shown here.

It is on this flywheel 12 that the primary bloc of the clutch, including the declutching device 11, is assembled.

The clutch release bearing 10 acts in this example by pushing on the declutching device 11 so as to release the friction liners from the clutch friction wheel in the manner described above, given that the clutch friction wheel includes a central hub which is splined internally for coupling it in rotation with the input shaft 3, which has a splined free end.

Control of the clutch can of course be obtained by pulling on the declutching device of the clutch, in the manner described in the document FR-A-2 698 931, to which reference can be made for further details.

Thus the hydraulic clutch control unit 9 can comprise two variable volume hydraulic control chambers, namely one hydraulic chamber and one pneumatic chamber.

In this example the control unit 9 comprises a control chamber which is adapted to be supplied with a gaseous or liquid fluid from the feed inlet 22.

In this embodiment, the control fluid is for example oil. It is therefore in the interests of simplicity that the control unit 9 is referred to as a hydraulic clutch control unit.

This control unit 9 comprises two parts in cylinder-and-piston relationship, so as to define the variable volume control chamber. One of the parts is fixed, since it is adapted to be fixed on the casing 1 of the gearbox, while the other part is movable and consists, in this example, of a piston 19 which is movable axially within a cavity 20 bounded by the fixed part so as to define the above mentioned control chamber.

The number of components in the fixed part depends on the application. This part may consist of one, two or three pieces. Here, a fixed part comprises, coaxially, an external body 13 of generally tubular form, and a concentric internal tube 14. The tube 14 is longer in the axial direction than the external body 13, and serves as a member for supporting and guiding the piston 19. The tube 14 has at its front end an end stop abutment 15 for limiting displacement of the piston 19, and at its rear end a generally transversely oriented flange 16. This flange 16 is fastened to the body 13 on the dorsal face of the latter.

This fastening may be obtained with the aid of screws, or by gripping, adhesive bonding, etc. In this example the fastening is obtained by seaming, and at 21 in FIG. 1 there can be seen one of the seaming sectors projecting from the external body 13. The tube 14 is of metal, and has a small thickness so as to reduce the overall radial size of the control unit. The input shaft 3 passes through the interior of the tube 14. The body 13 is of a mouldable material, aluminium based in this example, but of plastics material in another version. This is favourable to formation of the feed inlet 22 by a moulding process.

The body 13 also has ears 17 which have holes for fastening the control unit 9 to the casing 1, in this case with the aid of screws 18 which are fitted in the threaded holes in the casing 1.

In another version, of course, this fastening may be obtained with the aid of other fastening means such as rivets, bolts or the like, the number of ears varying according to the application.

The outer body 13 defines, with the internal tube 14, the axially oriented annular cavity 20. This cavity is blind, being closed by the flange 16.

The feed inlet 22 has an internal duct 26 which is open into the said cavity 20 in the region of the base 16 of the latter.

The piston 19 is sealingly mounted for axial movement within the cavity 20, and for this purpose it has a seal 25 at its rear end.

A seal is of course provided between the flange 16 and the outer body 13.

The piston 19 is thus able to penetrate to a greater or lesser extent into the cavity 20, according to whether the latter is pressurised or depressurised. In this way the above mentioned variable volume chamber is created.

More precisely, in order to disengage the clutch, the cavity 20 is pressurised, the effect of which is to displace the piston 19 and the clutch release bearing 10 towards the right in FIG. 1, whereby to disengage the clutch.

Figure 5:
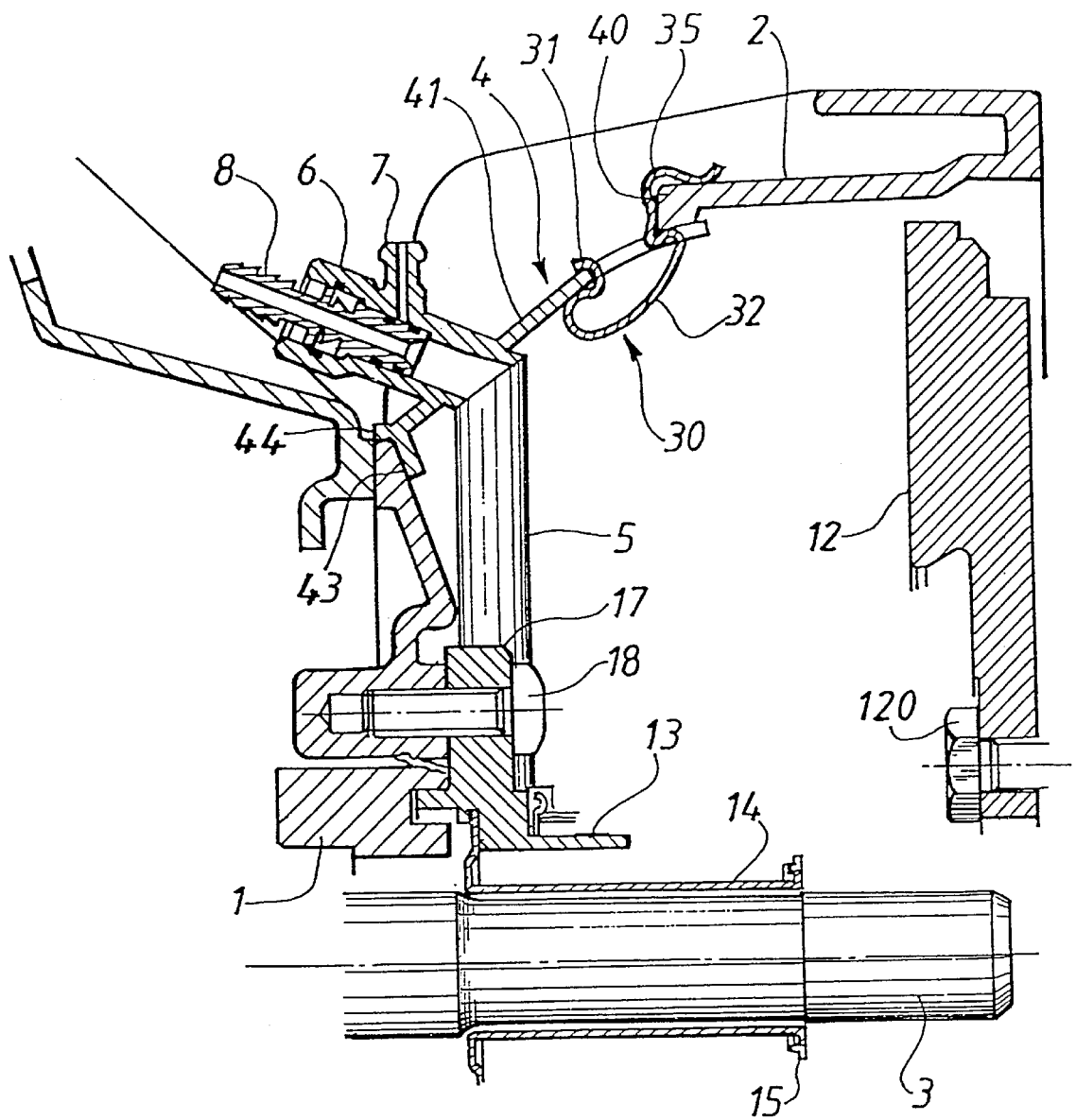
FIG. 5 is a view similar to FIG. 1 for another embodiment.

When the cavity 20 is depressurised, the diaphragm 11 displaces the release bearing 10, and therefore the piston 19, towards the left in FIG. 1, by compressing a permanent return spring 23 interposed axially between the body 13 and the piston 19, the spring 23 being surrounded in a manner known per se by a protective bellows 24, which is not shown complete in the upper part of FIGS. 1 and 5.

The spring 23 holds the release bearing 10 in permanent engagement on the diaphragm 11.

In this example the release bearing 10 is attached to the front end of the piston 19 by means of a so-called auto-centering ring 58.

More precisely, the inner ring of the rolling bearing, constituting the said release bearing 10, is profiled for point contact with the fingers of the diaphragm 11, while the outer ring of the rolling bearing includes a radial flange which extends radially towards the axis of the assembly in contact with a radial face plate portion, not denoted by a reference numeral, which is formed on the piston 19 at its front end, the said face plate portion also serving for abutment of the return spring 23, so as to clamp the end of the bellows 24 between the said face plate portion and the said spring 23. The other end of the spring bears indirectly on a shoulder of the external body 13, in this example on a member which is not denoted by a reference numeral, so as to hold the other end of the bellows 24.

The ring 58 has a general dihedral form, and is engaged at its inner end in a groove formed in the front end of the piston 19, while at its outer periphery it bears on the radial flange of the release bearing 10.

The release bearing 10 is thus attached to the piston while being able to be displaced radially with respect to the piston, and a radial clearance exists between the radial flange of the inner ring of the bearing 10 and the front end of the piston 19.

It will be noted that the end stop abutment 15 limits forward displacement of the piston 19, so that it is possible to build a sub-assembly comprising the piston 19 equipped with the release bearing 10 and the fixed body 13, 14.

The release bearing 10 may of course be fitted over the front end of the piston, and similarly the tube 14 may be thicker, and may also include ears for fastening the control unit 9 to the casing 1, as described in the document FR-A-2 698 931.

Typically, the hood 2 has an inspection cover (not shown) for giving access to the clutch.

Figure 2:
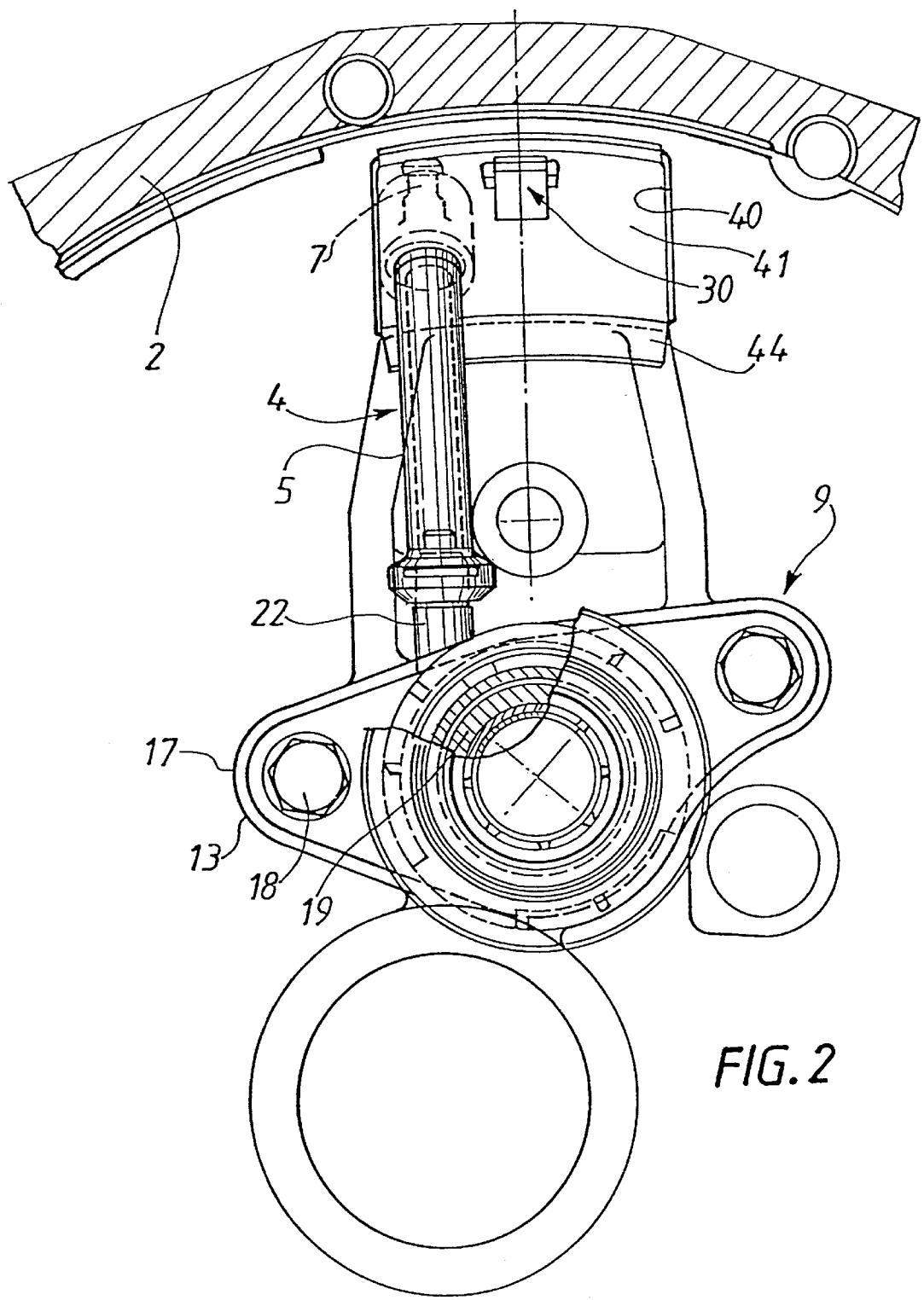
FIG. 2 is a view in the direction of the arrow 2 in FIG. 1.
Figure 3:
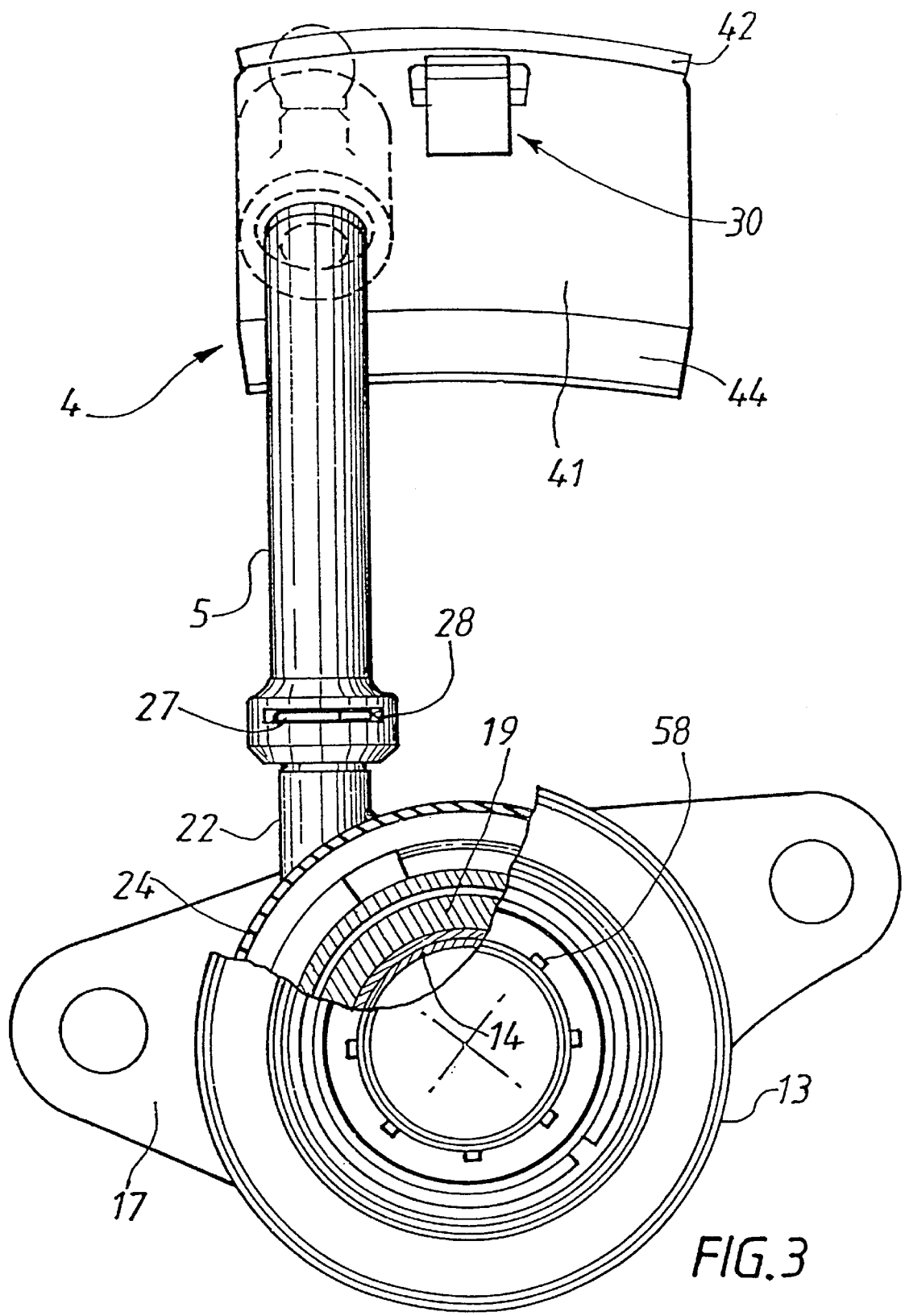
FIG. 3 is a view in the direction of the arrow 2 in FIG. 1, with the hood and the casing omitted.

In this example, the hood 2, being a body of revolution because it is in the form of a cloche, has an aperture 40 which in this example is of generally rectangular form, as can be seen in FIG. 2. This aperture 40 is bounded laterally by the wall of the casing 1 of the gearbox, given that the hood 2 in this example is integral with the said casing 1 and is arranged to be fixed at its free end on a casing hood which is included in the engine unit in a manner known per se.

Thus, FIG. 2 shows the holes, not indicated by a reference, through which the fastening bolts for the two hoods pass.

The aperture 40 is of bowed form, with axial ends which are offset radially from each other, and is arranged to be covered, in this example substantially fully, by a plate 41 which is part of the hydraulic connector 4 in accordance with the invention, the said connector enabling the control unit 9 mounted within the hood 2 to be coupled to an emitter which governs the control unit 9 and which is disposed outside the hood 2. In the known way, the said emitter is arranged to be actuated for example by the clutch pedal or an actuator, and has an outlet which is connected to the connector 4 through a duct not shown.

The plate 41 serves for fastening the connector 4 on the hood 2. This plate 41 in this example is integral (monobloc) with an inlet or feed duct 5, also referred to as a feed conduit 5, which is connected to the feed inlet 22 of the control unit 9.

The plate is of mouldable material such as plastics material. The said plate 41 is of bowed form.

In the known way, the feed duct (conduit) 5 extends, in accordance with one feature, on either side of the plate 41, and comprises generally a vertical inner portion connecting the inlet 22 to the plate 41, together with an oblique outer portion which extends mostly outside the plate 41 and includes a purge cock 7 and a pipe terminal 6. It is on this external pipe terminal 6 that the duct coming from the outside and associated with the control unit 9 is connected.

The external part of the duct is therefore, in this example, inclined with respect to the bowed plate 41.

The form of the duct 5 depends on the application, so that its outer portion is not necessarily inclined. The said duct 5 is fixed to the plate, being in this example integral with the plate 41. All of this is obtained by moulding, as is the purge cock 7.

Figure 4:
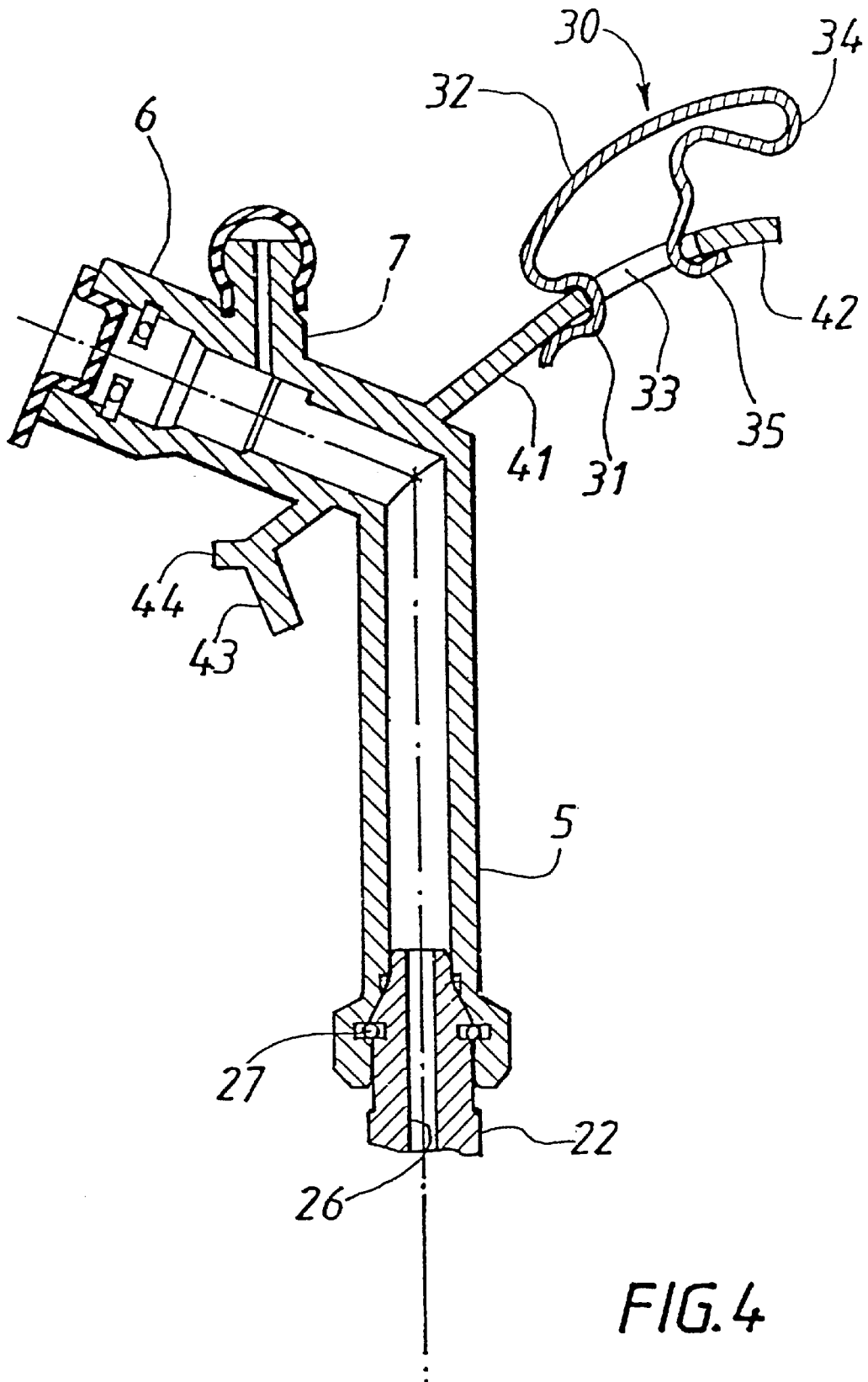
FIG. 4 is a view in axial cross section of the hydraulic connector in accordance with the invention, the feed inlet for the hydraulic control being partly shown.

As can best be seen in FIG. 4, the feed inlet 22 has a head with a penetrating form, being in this example of generally frusto-conical shape.

The duct 26 defined within the inlet 22 is open at the free end of the said head and into the cavity 20.

The head of the inlet 22 has a groove for receiving a resilient pinch clip 27, which is generally U-shaped and which penetrates into the widened inner end of the duct 5.

A seal, not denoted by a reference numeral, is of course provided for sealing this connection between the head 22 and the widened inner end of the duct 5.

For this purpose, the said end has a slot 28 (FIG. 4) to enable the branches of the generally U-shaped pinch clip 27 to pass through them, the said branches being engaged in the groove of the head of the feed inlet 22.

A method of assembly of this kind is described for example in the document FR-95 08087, published under the U.S. Pat. No. 2 736 136, to which reference may be made.

The outer end of the tubular feed conduit 5, constituted by the pipe terminal 6, also has a widened portion for fitting within it a connector nozzle 8 having an internal duct. This connector nozzle 8 has a ridged end portion for fitting to it a flexible pipe coming from the emitter.

The connector nozzle 8 is of the same type as that described in patent FR-B-2 736 136.

Thus in the fitted position, the connector nozzle 8 sealingly closes off the purge orifice 7 of the said terminal 6, outside the hood 2.

The connector nozzle may occupy a partially retracted position in which it is held by an elastic pinch clip, of the same type as the pinch clip 27, and in which the feed duct 5 is put into communication sealingly with the purge orifice 7, which has an internal duct.

The connector 4 also has a hole or opening, in this example a hole 33 formed through its plate 41 so as to carry the clip 30. This hole 33 serves, in accordance with the invention, for mounting a deformable clip 30 which has a hooking portion 34, 35 for cooperation with the edge of the aperture 40 in the hood 2.

The clip 30 may be plastically deformable. In this example, the clip is elastically deformable and is of metal, and is also thin. It may for example be made of spring steel.

The clip 30 has a central loop 32 which joins the hooking portion 34, 35 to a clipping portion 31 for assembly of the clip 30 to one of the lateral edges of the hole 33, which is generally rectangular as can be seen in FIG. 2. The clip 30 generally closes off the hole 33. Its clipping portion 31 is generally in the form of an omega, and is therefore in point contact with the lower and upper faces of the plate 41, the rounded portion of the clipping portion 31 extending around the edge of the hole 33. The clipping portion 31 grips the plate 41.

The loop 32 joins the clipping portion 31 to the hooking portion 34, 35, which is here again in the general form of a fastening clip. This portion includes a portion 35 which constitutes a generally U-shaped hook, and in FIG. 1, a loop 34 joining the element 35 to the loop 32. The portion 35 is in point contact, through its inner edge, with the lower face of the plate 41 in the embodiment of FIG. 1.

This internal branch is inclined, and is in point contact with the plate 41 through its free end.

The base of the U of the portion 35 is corrugated so as to make point contact with the edge of the aperture 40 of the hood.

The other branch (i.e. the outer branch) of the portion 35 is inclined, and includes, at its end joined to the portion 34, a rounded portion for making point contact with the upper face of the edge of the aperture in the hood 2.

The plate 41 is extended at one of its axial ends by an engagement portion 42 which is in contact with the lower face of the hood 2, and more precisely in contact with the lower face of the edge of the aperture 40.

Thus, after the connector 4 has been fitted on the wall 2, the clip 30 is in contact with the lower face of the plate 41, and more precisely in contact with the engagement portion 42 of the latter. It is clipped by means of its clipping portion 31 on the edge of the hole 33. This edge is opposite to that which defines the engagement portion 42.

As will have been understood, fitting of the secondary bloc on the casing 1 is rapid, because the said secondary bloc forms a unitary assembly which is able to be handled and transported due to the above mentioned configuration of the control unit.

This fitting is of course carried out before the primary bloc is offered up. The same is true for the fitting of the connector 4 and plate 41.

Fitting of the plate 41 is effected through the interior of the hood with engagement of the end of the duct 5 on the inlet 22, and attachment with the aid of the pinch clip 27, while clipping the plate 41 and the connector 4 on the hood 2 by means of the clip 30, the hooking portion 34, 35 of which comes into contact with the upper face of the hood.

The plate 41 is generally rectangular and bowed as mentioned above, so as intimately to follow the profile of the hood 2.

In the region of the other lateral edge of the aperture 40 (i.e. the one which is opposite to the engagement portion 42), that is to say at its other axial end opposite to the engagement portion 42, the plate 41 has a shoulder 44 which is adapted to engage on the hood 2, and more precisely, in this example, on the upper part of the casing 1.

Because of this arrangement, the plate 41 is held in place by the shoulder 44, and in combination with the clip 30 it cannot fall away, so that the fastening operation is inexpensive, easy, simple and rapid to carry out, as well as being reliable.

It will be noted that the plate 41 also has, in the vicinity of the shoulder 44, an edge portion 43 which is arranged to make intimate contact with the wall of the casing 1, as can best be seen in FIG. 1.

The edge portion 43 is axially behind the shoulder 44, and extends inwardly towards the control unit, and constitutes an axial abutment which, by cooperation with the wall of the casing 1 in one direction, limits axial movement of the plate. In the other axial direction, the plate is immobilised by the clip 30.

It will be appreciated that it is possible to test the control unit 9 in advance at this stage, by passing fluid under pressure into the conduit 5 in the form of a pipe, due to the presence of the end stop abutment 15 carried by the tube 14, which prevents the piston 9 from leaving the cavity 20.

After the connector 4 and the control unit have been fitted, the engine unit is brought up to the gearbox unit, and the fastening of the hoods of the said units is then carried out, given that the input shaft 3 is able to penetrate into the hub of the clutch friction wheel.

It will be noted that the edge portion 43 of the plate, by cooperation with the longitudinal edges of the aperture 40 in the hood 2, enables the plate to be immobilised against rotation, with the ends of the edge portion cooperating with the longitudinal edges of the aperture 40.

The plate 41 is in contact, through its engagement portion 42, with the lower face of the hood 2, and, through its shoulder, with the upper face of the hood.

Due to the cloche-shaped form of the hood 2, the engagement portion 42 is offset radially with respect to the shoulder 44, the plate being bowed as already mentioned.

It will be noted that the inclination of the outer part of the feed duct 5 is such that the said part is able to pass through the aperture 40 in the hood 2 without interference when the plate 41 is displaced axially within the hood 2, from right to left in FIGS. 1 to 5. The aperture 40 can thus be made shallow.

Thus in the present case, due in particular to the end stop abutment 15, a sub-assembly, consisting of the hydraulic control unit 9 and its connector, is constructed in advance.

It is therefore possible to test and control in advance the sub-assembly which can be handled and transported and cannot be lost. The sub-assembly is subsequently inserted into the hood. More precisely, the internal tube 14 is inserted axially on the input shaft 3 of the gearbox until the ears 17 and the edge portion 43 come into abutment with the end wall of the casing 1, with the outer part of the duct 5 passing through the aperture 40. During this phase, the clip 30 retracts because it is elastically deformable.

Subsequently, the control unit is fixed on the casing 1 by means of the screws 18, and by snap-fitting of the clip 30 on the hood 2. The connector nozzle 8, fixed to the tube coming from the emitter, is then introduced into the pipe terminal 6. This can be done because of the clip 30, which is able to deform and retract.

Final fitting on the power train is therefore rapid, and is carried out in a simple way by axial insertion.

As a result, the duct 5 can be connected to the feed inlet 22 by any type of connector, for example screw connectors.

It may of course be that the clip 30 is not fitted in advance on the plate 41, being then fitted in place after the edge portion 43 has been brought into engagement with the wall of the casing 1, preferably before the emitter outlet pipe connector nozzle 8 is connected.

The present invention is of course not limited to the embodiment described. Thus, although in the foregoing Figures the clip 30 had a loop 32 lying on the outside of the hood 2, it is possible to reverse the structures in such a way that the loop 32 lies inside the hood 2, as can be best seen in FIG. 5.

Thus, in this figure, the portion 34 is omitted, the end of the outer branch of the hook 35 having a bowed portion for making point contact with the upper face of the hood 2. In all cases, the portion 35 constitutes a U-shaped fastening hook with inclined branches which are brought towards each other.

These branches are of different lengths, the outer branch being adapted to make contact with the upper face of the hood and being longer in the axial direction, and therefore more flexible, than the inner branch.

In FIG. 1 the portion 34 is favourable to fitting on the hood 2 without any jamming. In FIG. 5, this jamming is avoided by the beak-shaped curved end portion of the outer branch of the fastening hook 35. The base of the hook has a central rounded point for contact with the edge of the wall of the hood. The loop 32 assists ventilation. The opening or hole 33 may be blind, as shown in FIG. 5, the hook 35 being in contact with the lower face of the hood 2 through its inner branch.

The engagement portion 42 lies in contact also with the lower face of the hood 2.

It will be noted that the hood 2 is thickened in the region of its zone of contact with the fastening hook 35 of the clip 30, which acts as a fastening clip, and that the engagement shoulder 44 and the engagement portion 42 are in contact with the upper face and lower face of the hood 2 respectively, which enables the plate 41 to be mounted within the hood 2, and enables good retention of the plate 41 to be obtained.

The clip 30 holds the plate 41 in contact with the hood, and enables the plate 41 to be snap-fitted to the hood 2.

The plate 41 may of course be of metal, and the duct may be secured to the plate 41 either by welding or mechanically, having for this purpose a collar portion through which the duct passes and which enables the duct to be fastened by seaming to the plate.

Similarly, the duct 5, fixed to the plate, may have a base, for example with two ears, for fastening the duct 5 on the head 22, which in that event is threaded so as to receive screws passing through the ears of the terminal base of the duct, with a seal being interposed between the base and the head.

The clutch release bearing may take a different form, and may include a flexible membrane which is able to be unwound and which cooperates with the casing of the gearbox, as in the document FR-A-2 194 263.

The duct 5, fixed to the plate, may have at its end an axially oriented return portion for axial mounting on the feed inlet, as described in the document DE-44 12734, in which the rolling bearing of the clutch release bearing is of reduced size and is mounted within the piston.

The duct 5 may pass through a plate, as can be seen in FIG. 1 of the document FR-A-2 194 263.

I claim:

1. A hydraulic connector, for a hydraulic clutch control unit (9), which, firstly, is provided with a control chamber (19, 20) and a feed inlet (22) for its control chamber (20, 19) and, secondly, is mounted within a hood (2) comprising, firstly, a plate (41) for fastening the connector on the hood (2) and for covering at least a major part of an aperture (40) formed in the hood (2) for giving access to the feed inlet (22), and secondly, a feed duct (5) carried by said plate (41) for connecting the feed inlet (22) of the control unit (9) to an emitter governing the latter, characterised in that the plate (41) carries a deformable clip (30) having a hooking portion (34, 35) for cooperation with the edge of the aperture (40) in the hood (2).

2. A connector according to claim 1, characterized in that the clip (30) is plastically deformable.

3. A connector according to claim 1, characterized in that the clip (30) is elastically deformable.

4. A connector according to claim 1, characterized in that the plate (41) has a hole (33) for mounting the clip (30) therein.

5. A connector according to claim 4, characterized in that the clip (30) has a clipping portion (31) for assembling the clip (30) on the edge of the hole (33).

6. A connector according to claim 5, characterized in that the clip (30) includes a loop (32) joining the clipping portion (31) to the hooking portion (34, 35).

7. A connector according to claim 6, characterized in that the hooking portion includes a generally U-shaped fastening hook (35) having a corrugated base for point contact with the edge of the aperture.

8. A connector according to claim 7, characterized in that said fastening hook (35) is adapted to cooperate by means of a first one of its branches with the upper face of the edge of the aperture (40) in the hood (2).

9. A connector according to claim 8, characterized in that the loop of the clip (30) lies outside the hood, the second branch of its fastening hook (35) being in contact with an engagement portion (42) defining the edge of the hole (33) in the plate (41), the portion (42) being arranged to make contact with the lower face of the edge of the aperture (40) in the hood (2).

10. A connector according to claim 8, characterized in that the loop (32) of the clip (30) lies within the hood (2) and is arranged to cooperate, through the second branch of its fastening hook (35), with the lower face of the edge of the aperture (40) in the hood (2).

11. A connector according to claim 1, characterized in that the feed duct (5) is fixed to the plate (41).

12. A connector according to claim 11, characterized in that the feed duct (5) is monobloc with the plate (41), being made with the latter by moulding.

13. A connector according to claim 11, characterized in that the feed duct (5) is in two parts extending on either side of the plate (41), namely an inner part extending within the hood (2) so as to be engaged with the head of the feed inlet (22), and an outer part extending mainly outside the hood (2).

14. A connector according to claim 13, characterized in that the outer part includes a purge orifice (7) extending outside the hood (2).

15. A connector according to claim 14, characterized in that the free end of the outer part of the feed duct (5) is widened for fitting a connector nozzle (8) adapted to obturate the purge orifice (7) and to open up the said orifice (7).

16. A connector according to claim 13, characterized in that the end of the inner part of the feed duct (5) is widened for cooperation with the penetrating head of the feed inlet (22).

17. A connector according to claim 16, characterized in that the end of the inner part of the duct (5) is connected to the head of the feed inlet (22) by a pinch clip (27).

18. A connector according to claim 13, characterized in that the outer part of the duct (5) is inclined with respect to the plate (41), so that it is adapted to traverse, axially and without interference, the aperture (40) of the hood (2), which is bowed, with axial ends offset radially from each other.

19. A connector according to claim 1, characterized in that the plate (41) has at one of its axial ends an engagement portion (42) adapted to make contact with the lower portion of the hood (2), and at the other of its axial ends a shoulder (44) adapted to make contact with the upper end of the hood.

20. A connector according to claim 19, characterized in that the shoulder (44) is close to an edge portion (43) extending radially inwards and adapted to cooperate with a casing wall.

21. A hydraulic connector, for a hydraulic clutch control unit (9), which, firstly, is provided with a control chamber (19, 20) and a feed inlet (22) for its control chamber (19, 20) and, secondly, is mounted within a hood (2) comprising, firstly, a plate (41) for fastening the connector on the hood (2) and for covering at least a major part of the aperture (40) formed in the hood (2) for giving access to the feed inlet (22), and secondly, a feed duct (5) carried by the plate (41) for connecting the feed inlet (22) of the control unit (9) to an emitter governing the latter, characterized in that the plate (41) carries a deformable clip (30) having a hooking portion (34, 35) for cooperation with the edge of the aperture (40) in the hood (2), and in that the plate (41) has a hole (33) for mounting the clip (30).

22. A hydraulic connector, for a hydraulic clutch control unit (9), which, firstly, is provided with a control chamber (19, 20) and a feed inlet (22) for its control chamber (19, 20) and, secondly, is mounted within a hood (2) comprising, firstly, a plate (41) for fastening the connector on the hood (2) and for covering at least a major part of the aperture (40) formed in the hood (2) for giving access to the feed inlet (22), and secondly, a feed duct (5) carried by the plate (41) for connecting the feed inlet (22) of the control unit (9) to an emitter governing the latter, characterized in that the plate (41) carries a deformable clip (30) having a hooking portion (34, 35) for cooperation with the edge of the aperture (40) in the hood (2), and in that the plate (41) includes a shoulder (44) for cooperation with a portion of the edge of the aperture in the hood (2) and for retaining said plate in position.

* * * * *